United States Patent Office 3,544,270
Patented Dec. 1, 1970

---

3,544,270
AQUEOUS HYDROXYLAMINE SOLUTIONS STABILIZED WITH HYDROXYUREA OR HYDROXYTHIOUREA DERIVATIVES
Donald D. Carlos, Crown Point, Ind., assignor to Sinclair Oil Corporation, a corporation of New York
No Drawing. Filed Aug. 13, 1968, Ser. No. 752,138
Int. Cl. C01c *1/00;* C09k *3/00*
U.S. Cl. 23—190                 6 Claims

ABSTRACT OF THE DISCLOSURE

Hydroxylamine in aqueous solution is stabilized with respect to oxidation deterioration by an hydroxyurea or hydroxythiourea derivative present in a small amount, often about 0.01 to 1 weight percent based upon the aqueous solution.

---

This invention relates to stabilized aqueous solutions of hydroxylamine.

Aqueous solutions containing hydroxylamine are used in synthesis work but the instability of the reagent greatly limits its utility in cases where storage is necessary and in reactions where product purity is important. The problem of instability of aqueous solutions containing hydroxylamine is particularly serious when these solutions are obtained by ion-exchange techniques.

It has been found that hydroxyurea and hydroxythiourea derivatives, when present in small concentrations, exhibit a remarkable inhibiting effect toward autoxidation of hydroxylamine in aqueous solution. These hydroxyurea and hydroxythiourea derivatives show a superior inhibiting effect over, for instance, the tetrasodium salt of ethylenediaminetetraacetic acid, a known inhibitor.

According to the invention, hydroxylamine in aqueous solution can be stabilized from oxidation deterioration with a hydroxyurea or hydroxythiourea derivative. The amount of the derivative can be a small amount sufficient to inhibit oxidative deterioration of the hydroxylamine solution, and usually is about 0.01 to 1 weight percent or more of the aqueous solution, and preferably can be about 0.05 to 0.2 weight percent. The aqueous solution containing hydroxylamine can be produced by the reaction of a hydroxylamine hydrohalide salt in aqueous solution, such as hydroxylamine hydrochloride, with an alkali metal hydroxide, such as sodium hydroxide. Hydroxylamine hydrosulfate or any other suitable acid salt or other convenient form can also be used. The hydroxylamine is usually at least about 1 weight percent of the aqueous solution and can be up to saturation or more, but is conveniently about 3 to 15 weight percent.

The hydroxyurea or hydroxythiourea derivatives used as stabilizers for aqueous hydroxylamine solutions according to this invention have the general formula:

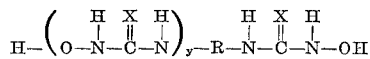

wherein X is oxygen or sulfur, $y$ is 0 or 1 and R is a hydrocarbon radical of up to about 15 carbon atoms, preferably having about 4 to 10 carbon atoms. The R group can be saturated or unsaturated, e.g., be olefinically-unsaturated, and can be an aliphatic, including cycloaliphatic, aromatic or mixed aliphatic-aromatic group. Also the R group can be substituted with nondeleterious substituents. A suitable hydroxyurea derivative is N-phenyl-N'-hydroxyurea and a suitable hydroxythiourea derivative is N-phenyl-N'-hydroxythiourea. Other suitable hydroxyurea and hydroxythiourea derivatives include N,N'-bis-(formo hydroxamino)-p-phenylene diamine

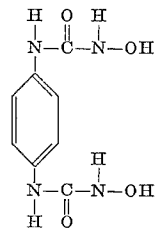

and the corresponding thiourea derivative whose preparation is described in the copending application of David W. Young and Donald D. Carlos, Serial No. 753,083, filed Aug. 16, 1968. It is not necessary to add the hydroxyurea or hydroxythiourea derivative as such to the hydroxylamine solution since the incorporation in the solution of a substance capable of reacting with hydroxylamine in aqueous solution to form the hydroxyurea or hydroxythiourea derivatives will bring about stabilization of hydroxylamine. Illustrative of the types of compounds that can be added are the aliphatic, aromatic and mixed aliphatic-aromatic mono- and diisocyanates, as well as the similar isothiocyanates, such as phenylisocyanate and n-butylisothiocyanate and similar diisocyanates.

The present invention will be illustrated by the following examples.

EXAMPLE I

A series of samples were prepared wherein hydroxylamine in aqueous solution was stabilized by the addition of an inhibiting agent. The aqueous solution containing hydroxylamine was prepared by neutralization of hydroxylamine hydrochloride in aqueous solution with sodium hydroxide. All samples were stored in capped bottles maintained in a daylight laboratory at room temperature. The inhibiting agent was added to the aqueous solution in an amount of 0.1 percent by weight of the solution, each sample containing approximately 7.15 percent by weight of hydroxylamine.

The Raschig method for the determination of hydroxylamine was used in the tests. This method involves the quantitative oxidation of hydroxylamine to nitrous oxide by ferric ion in strongly acid solution. The ferrous ion so formed is determined by titration with standard permanganate.

The details and results obtained using the different inhibiting agents are given in the table below:

PERCENT HYDROXLAMINE IN SAMPLE AT TIMES INDICATED

| Inhibiting agent | Time (hours) | | | | | | |
|---|---|---|---|---|---|---|---|
|  | 0 | 4 | 30 | 54 | 78 | 438 | 702 |
| No inhibiting agent | 7.15 | 6.91 | 5.22 | 3.78 | 1.71 | 0.00 | |
| Tetrasodium salt of ethylenediamine, tetra-acetic acid | 7.15 | | 6.92 | 6.69 | | 3.85 | 2.42 |
| N-phenyl-N', hydroxyurea | 7.15 | | 6.44 | 6.40 | | 6.27 | 6.18 |
| Phenylisocyanate | 7.15 | | 7.08 | 7.10 | | 6.32 | 5.76 |
| n-Butylisocyanate | 7.15 | | 7.04 | | 6.99 | 7.02 | 6.35 |
| N-phenyl-N', hydroxythiourea | 7.15 | | 7.02 | | 6.84 | 6.66 | 6.59 |
| n-Butylisothiocyanate | 7.15 | | 7.06 | 7.04 | | 6.90 | 6.79 |

As shown in the above table, the sample containing no inhibiting agent was almost completely decomposed in 78 hours. The samples stabilized with the hydroxyurea or hydroxythiourea derivatives of this invention or with agents which form such derivatives in the solution showed little deterioration after 702 hours (over 29 days), while the sample stabilized with the tetrasodium salt of ethylenediaminetetra-acetic acid was well over 50% decomposed in this time.

As shown in Example I, and as previously stated, it is not necessary to add the hydroxyurea or hydroxythiourea derivative as such. The incorporation in the solution of a substance capable of reacting with hydroxylamine in aqueous solution to form the hydroxyurea or hydroxythiourea derivative will bring about stabilization of the hydroxylamine solution. The use of phenylisocyanate, n-butylisocyanate and n-butylisothiocyanate in Example I illustrate this aspect of the invention.

It is claimed:
1. Hydroxylamine in aqueous solution containing a small stabilizing amount of a urea compound having the formula:

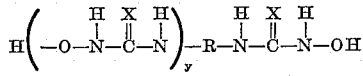

wherein X is oxygen or sulfur, y is 0 or 1 and R is a hydrocarbon group of up to about 15 carbon atoms.

2. The hydroxylamine solution of claim 1 wherein said urea compound is present in an amount of about 0.01 to 1 weight percent based on the aqueous solution.
3. The hydroxylamine solution of claim 1 wherein said urea compound is N-phenyl-N'-hydroxyurea.
4. The hydroxylamine solution of claim 3 wherein said N-phenyl-N'-hydroxyurea is present in an amount of about 0.05 to 0.2 weight percent based on the aqueous solution.
5. The hydroxylamine solution of claim 1 wherein said urea compound is N-phenyl-N'-hydroxythiourea.
6. The hydroxylamine solution of claim 5 wherein said N-phenyl-N'-hydroxythiourea is present in an amount of about 0.05 to 0.2 weight percent based on the aqueous solution.

References Cited

FOREIGN PATENTS 714,226   8/1954   Great Britain _____ 23—190A

OSCAR R. VERTIZ, Primary Examiner

H. S. MILLER, Assistant Examiner

U.S. Cl. X.R.

252—380